US011379141B2

(12) United States Patent
Jain

(10) Patent No.: US 11,379,141 B2
(45) Date of Patent: Jul. 5, 2022

(54) SSD SUPPORTING READ-ONLY MODE AFTER PLP BACKUP FAILURE

(71) Applicant: Kioxia Corporation, Minato (JP)

(72) Inventor: Amit Jain, Cupertino, CA (US)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 16/944,713

(22) Filed: Jul. 31, 2020

(65) Prior Publication Data

US 2022/0035552 A1 Feb. 3, 2022

(51) Int. Cl.
*G06F 3/06* (2006.01)
*G06F 13/42* (2006.01)
*G06F 13/16* (2006.01)

(52) U.S. Cl.
CPC .......... *G06F 3/0647* (2013.01); *G06F 3/0619* (2013.01); *G06F 3/0679* (2013.01); *G06F 13/1668* (2013.01); *G06F 13/4282* (2013.01)

(58) Field of Classification Search
CPC .... G06F 3/0619; G06F 3/0647; G06F 3/0679; G06F 13/1668; G06F 13/4282
See application file for complete search history.

(56) References Cited

U.S. PATENT DOCUMENTS

| | | | | |
|---|---|---|---|---|
| 9,836,232 B1* | 12/2017 | Vasquez | ............. | G06F 12/0804 |
| 2012/0203958 A1* | 8/2012 | Jones | ................. | G06F 12/0246 |
| | | | | 711/E12.008 |
| 2013/0054869 A1* | 2/2013 | Tolia | ...................... | G06F 16/00 |
| | | | | 711/102 |
| 2016/0117099 A1* | 4/2016 | Prins | ................... | G06F 11/1441 |
| | | | | 711/103 |
| 2016/0335006 A1* | 11/2016 | Rose | ..................... | G06F 3/0688 |
| 2019/0034107 A1* | 1/2019 | Kim | ..................... | G06F 3/0635 |
| 2020/0004450 A1* | 1/2020 | Secatch | ................ | G06F 3/0679 |
| 2020/0242021 A1* | 7/2020 | Gholamipour | ...... | G06F 12/0804 |
| 2020/0409843 A1* | 12/2020 | Nagabhirava | ....... | G06F 11/0751 |

* cited by examiner

*Primary Examiner* — Eric T Oberly
(74) *Attorney, Agent, or Firm* — Allen & Overy LLP

(57) ABSTRACT

A method of operating a Solid State Drive (SSD), comprising identifying critical metadata corresponding to data previously written to the SSD. In response to a power loss event the method also includes storing the critical metadata in a non-volatile memory. Further, the method also involves writing a first table of contents corresponding to the stored critical metadata to the non-volatile memory and storing a pointer to the first table of contents. A Solid State Drive (SSD) including a memory controller, a non-volatile memory, and a power loss protection capacitor. The memory controller is configured to identify critical metadata corresponding to data previously written to the SSD. The memory controller is also configured to, in response to a power loss event, store the critical metadata in a non-volatile memory write a first table of contents corresponding to the stored critical metadata to the non-volatile memory, and store a pointer to the first table of contents.

20 Claims, 3 Drawing Sheets

SSD SUPPORTING READ-ONLY MODE AFTER PLP BACKUP FAILURE

FIELD OF INVENTION

This invention generally relates to Solid State Drives (SSDs) implementing techniques designed to ensure that the SSD can enter at least read-only mode after the power loss protection (PLP) fails.

BACKGROUND OF THE INVENTION

SSDs are surpassing traditional spinning disk hard drives due to the performance benefits of SSDs. SSDs provide a number of advantageous, particularly in reduced latency that make SSDs advantageous for use in data centers and other applications that require large and rapid data movement. SSDs are even replacing traditional spinning disk hard drives in personal computers.

In order to manage the data stored on SSDs, an SSD needs to keep track of certain metadata that allows it to know what changes have been made to the data stored on the SSD and where that data has been stored. In order to reduce latency and keep throughput high, metadata is stored in fast volatile memory such as DRAM rather than the non-volatile, but slower, NAND flash. However, during a power loss event, it is critical to store this metadata and any other data in the volatile memory into non-volatile, as part of a process called "hardening," in order to preserve the data.

If the metadata is lost, the SSD will not be able to determine what data is stored where and as a result will not allow any access to any data. This includes a loss of access to all of the data stored in the non-volatile memory even if the data was stored well prior to the loss of power event.

Some SSDs are designed to harden all of data stored in volatile memory in response to a power loss event. This data is not limited to critical metadata needed to operate the drive, but may include non-critical metadata and cache data. Non-critical metadata and buffer data, although not permanently stored, can be lost without completely preventing all access to the SSD on power restoration. However, a result of trying to save all of the volatile data, including data that is not critical to operation of the SSD, is that there is an increase in the amount of time and energy needed to effectively harden all of the data and a table of contents that points to all the stored data.

In many traditional SSDs, the table of contents is written only after all of the data is saved. However, if the backup power, for example power provided by a PLP capacitor fails before all of the data is saved and the table of contents is written, then the SSD can become totally unrecoverable. Although manufactures attempt to predict how much energy will be needed to fully harden all of the volatile data, this is not always possible. Further, as an SSD ages, certain PLP components such as a PLP capacitor may no longer perform as originally designed. As a result, it is impossible to guarantee that an SSD will have enough backup power to fully harden all of the volatile data and create a table of contents pointing to the harden data prior to complete power loss.

One alternative approach is seen in some consumer SSDs, which lack PLP capacitors/backup power, where metadata logs are created continuously at runtime so that when a power loss occurs, the SSD firmware can then recreate the needed metadata and other volatile by reading and replaying the logs. However, this approach is unsuitable for large scale operation for a number of reasons. For example, constantly writing metadata logs at runtime creates latency because this writing competes with all other write operations to the SSD. Further, designing and maintain metadata logs is a complicated task which not only adds development overhead, but processing overhead that reduces the effectiveness of an SSD.

Accordingly, there is a long felt and unmet need to create an approach for saving critical metadata in SSDs with PLP protection components that reduces the risk that a power loss event renders the SSD completely operational, but without reducing the efficiency of the SSD.

BRIEF DESCRIPTION

According to certain embodiments of the present invention operating an SSD involves identifying critical metadata corresponding to data previously written to the SSD. In response to a power loss event, the method also includes storing the critical metadata in a non-volatile memory, writing a first table of contents corresponding to the stored critical metadata to the non-volatile memory, and storing a pointer to the first table of contents.

According to certain embodiments of the present invention, the method also includes storing data, stored in a write buffer, in the non-volatile memory; and storing non-critical metadata in the non-volatile memory. According to yet further embodiment, the method also includes writing a second table of contents corresponding to the stored critical metadata, the stored non-critical metadata, and to the stored write buffer data to the non-volatile memory; and updating the pointer to point to the second table of contents.

According to yet other embodiments of the present invention the method also includes in response to a restoration of power event, determining whether the pointer points to the first table of contents or a second table of contents corresponding to stored critical metadata, stored non-critical metadata, and stored write buffer data. According to additional embodiments of the present invention, the method also comprises if the pointer points to the first table of contents, entering a read-only mode, and if the pointer points to the second table of contents, entering a read-write mode and processing the stored write buffer data.

In certain other embodiments of the present invention, wherein storing the pointer comprises storing the pointer in a second non-volatile memory different than the non-volatile memory. In certain embodiments of the present invention, the second non-volatile memory is SPI-NOR flash memory.

In some embodiments of the present invention the non-volatile memory is NAND flash.

In yet certain other embodiments, the first table of contents comprises a plurality of entries, each pointing to a different data structure of a plurality of data structures. In some additional embodiments, the second table of contents comprises a plurality of entries, each pointing to a different data structure of a plurality of data structures.

According to certain embodiments of the present invention, an SSD comprises a memory controller, a non-volatile memory; and a power loss protection capacitor. The memory controller is configured to identify critical metadata corresponding to data previously written to the SSD and in response to a power loss event store the critical metadata in a non-volatile memory, write a first table of contents corresponding to the stored critical metadata to the non-volatile memory, and store a pointer to the first table of contents.

In some embodiment, in response to a power loss event the memory controller is configured to store data, stored in the write buffer, in the non-volatile memory and store data, stored in the write buffer, in the non-volatile memory. In some additional embodiments of the present invention the memory controller is also configured to write a second table of contents corresponding to the stored critical metadata, the stored non-critical metadata, and to the stored write buffer data to the non-volatile memory and update the pointer to point to the second table of contents.

In some other embodiments of the present invention the memory controller also is configured to in response to a restoration of power event, determine whether the pointer points to the first table of contents or a second table of contents corresponding to stored critical metadata, stored non-critical metadata, and stored write buffer data. In certain additional embodiments the SSD is configured to if the pointer points to the first table of contents, enter a read-only mode; and if the pointer points to the second table of contents, enter a read-write mode and process the stored write buffer data.

In some other embodiments of the present invention, the SSD further comprises a second non-volatile memory different from the non-volatile memory and the memory controller is configured to store the pointer in the second non-volatile memory. In yet more embodiments of the present invention, the second non-volatile memory is SPI-NOR flash memory.

In certain embodiments of the present invention, the non-volatile memory is NAND flash memory.

In some embodiments of the present invention, the first table of contents comprises a plurality of entries, each pointing to a different data structure of a plurality of data structures. According to certain embodiments of the present invention the second table of contents comprises a plurality of entries, each pointing to a different data structure of a plurality of data structures.

DETAILED DESCRIPTION

Figure 1:
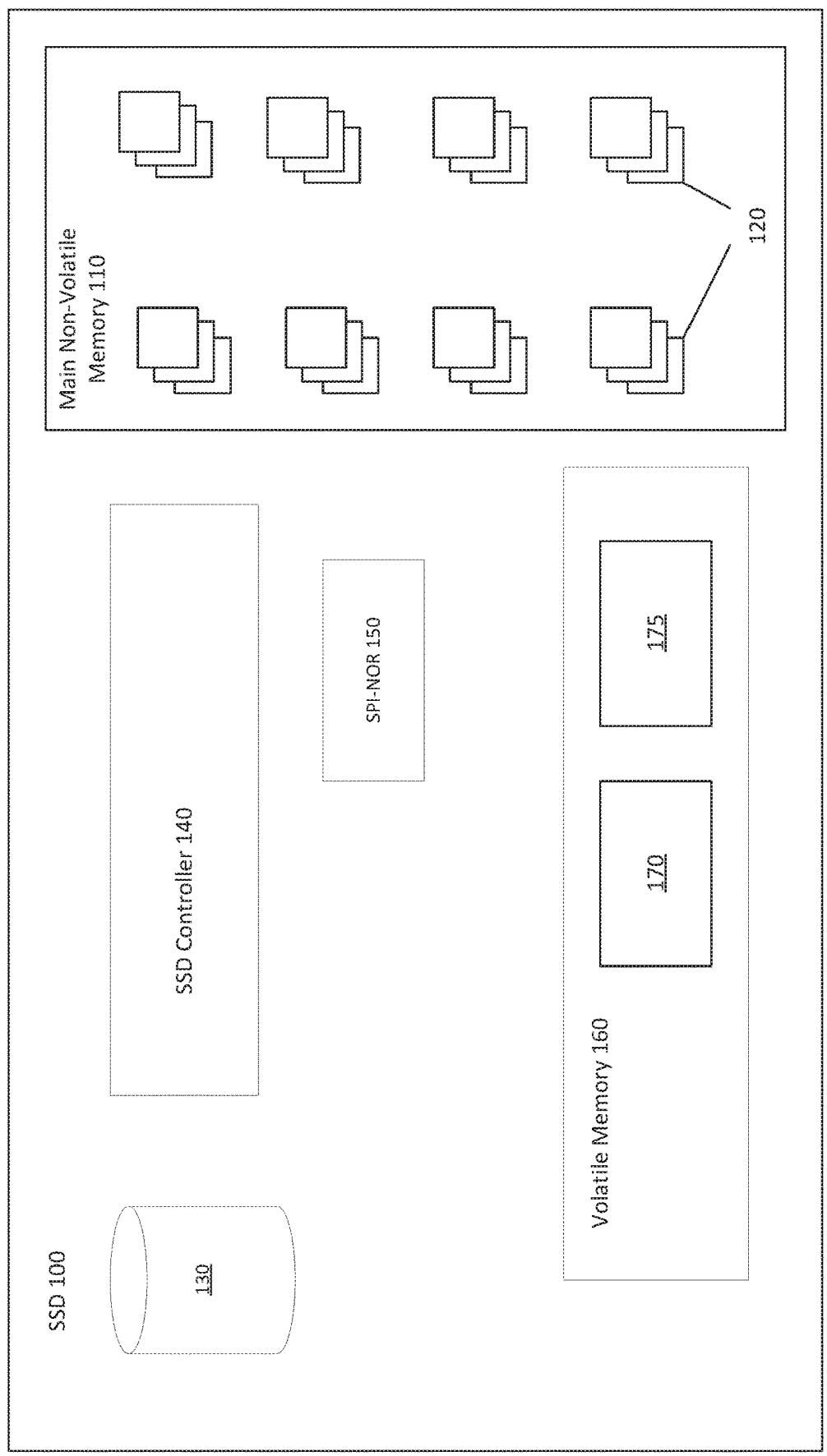
FIG. 1 illustrates an SSD according to certain embodiments of the present invention.

FIG. 1 illustrates an SSD 100 in accordance with certain embodiments of the present invention, which includes a number of different types of memories.

For examples, SSD 100 includes a main non-volatile memory 110. Main non-volatile memory 110 operates as the bulk storage component of SSD 100 and is designed to store data long term. In certain embodiments of the present invention, main non-volatile memory 110 is NAND flash memory which comprises a plurality of NAND dies 120. Data is written to the various dies 120. A person of ordinary skill in the art would understand that a number of other main volatile memory types can be used without departing from the spirit of the invention.

SSD 100 can also include volatile memory 160, which can be any number of different types of volatile memory such as SRAM and DRAM without departing from the spirit of the invention. Volatile memory 160 is faster than main non-volatile memory 110. As a result, SSD 100 uses volatile memory 160 for storing data that needs to accessed or stored quickly.

For example, volatile memory 160 stores the critical metadata 170 for SSD 100. Critical metadata 170 stores information about the data that is stored on main non-volatile memory 110. Critical metadata 170 is essential for accessing main non-volatile memory 110. Without critical metadata 170, the SSD 100 cannot tell what data is stored on main non-volatile memory 110 or where in main non-volatile memory 110 any data is stored. If critical metadata 170 is lost, SSD 100 becomes nonoperational or "bricked" and even data stored prior to the loss of critical metadata 170, in main non-volatile memory 110, cannot be read from SSD 100. The loss of critical metadata 170 may prevent the successful continued operation or restart/reboot of the SSD (failure to operate or restart/reboot successfully is often termed "bricking" the SSD, from the SSD behaving like a brick, i.e. completely unresponsive). Critical metadata 170 may include logical to physical mapping tables, superblock tables, superblock lists, a grown bad block table, RAID parity information, front end user configured settings, NAND error and reliability information. However, a person of ordinary skill in the art would understand that the foregoing are only examples and that the information that makes up the critical metadata 170 may vary without departing from the spirit of the invention.

Volatile memory 160 can also store non-critical data 175. Non-critical data 175 can include additional metadata such as recent incomplete commands, uncommitted TRIM information, and debug logs. Additionally, non-critical data 175 can include buffer data such a write buffer information. The write buffer data is temporarily stored until the SSD 100 writes the data to main non-volatile memory 110. Since volatile memory 160 is faster than main non-volatile memory 110 it can be advantageous to store data as write buffer data in order to reduce system latency. A person of ordinary skill in that art would understand that a number of different types of data can be part of non-critical data 175, such as data in a read buffer, without departing from the spirit of the invention.

Non-critical data 175 should be hardened, if possible. For example, hardening the write buffer data will allow SSD 100 to playback the dirty write buffer and store the write data accordingly once SSD 100 regains power.

In accordance with certain embodiments of the present invention, if non-critical data 175 is not hardened, the failure to store this data will not prevent SSD 100 from running. In situations where the PLP system fails before all of the non-critical data 175 is stored, but all of the critical metadata 170 is stored and accessible, SSD 100 will be able to boot into read-only mode and allow access to the previously stored data kept in main non-volatile memory 110.

SSD controller 140 needs reserve power in order to harden data stored in volatile memory 160 following a power loss event. The SSD controller 140 may be firmware, hardware, software, or a combination thereof. In some embodiments of the present invention, PLP capacitor 130 provides the aforementioned reserve power. PLP capacitor 130 charges during normal operation and discharges until either all of the data stored in volatile memory 160 is hardened and SSD 100 completes a full shutdown, or until all of the reserve power in the PLP capacitor 130 is depleted. Although, the FIG. 1 illustrates a PLP capacitor 130, a person of ordinary skill in the art would understand that any number of other PLP devices, such as a battery, can be used without departing from the spirit of the invention.

As hinted at above, following a power loss event, where main power is lost, SSD controller 140 will work to write data stored in volatile memory 160 to main non-volatile memory 110. However, as main non-volatile memory 110 actually consists of a plurality of non-volatile memory dies, simply writing the data to main non-volatile memory 110 is not enough. Without additional information, the data is disorganized and of little to no value because upon recovery, SSD Controller 140 is unable to determine what data from volatile memory 160 has been stored where.

Thus, SSD 100 needs to store a table of contents, or other information, that can be used by SSD controller 140 to find and manage the hardened data. In order to locate the table of contents, or other information about the location and nature of the hardened data, SSD 100 may store a pointer to one or more table of contents in a secondary non-volatile memory that is different than main non-volatile memory 110. For example, SSD 100 may contain SPI-NOR flash 150 to store pointer to the table of contents or other information about the hardened data. The use of this alternative non-volatile memory can provide a number of advantages. First, this memory may be faster and less power-consuming than main non-volatile memory 110. Further, since SPI-NOR 150 is not the main non-volatile memory 110 for SSD 100, it can be reserved for specific tasks and memory areas can be pre-allocated and fixed. As a result, it is possible to hardcode within the firmware or software of SSD controller 140 the location of information within the SPI-NOR 150. This would include the location of a pointer to the table of contents, so that the SSD controller 140 can easily find critical information upon booting after a power loss event. Although FIG. 1 references SPI-NOR 150, a person of ordinary skill in the art would understand that other type of non-volatile memory may be suitable for providing the specialized non-volatile memory. For example, a select portion of non-volatile memory 110 may be pre-allocated such that it is in a separate location than the superblocks storing user data in non-volatile memory 110.

However, traditional SSDs only write the table contents after all of the data has been hardened. In fact, because of this approach, some traditional SSDs do not even keep track of the order in which volatile data is harden. As a result, if a PLP capacitor fails prior to an SSD completing the hardening process, then the SSD will lose access to all of the previously volatile data. This loss would include the critical metadata, the loss of which cripples the SSD.

However, SSDs, such as SSD 100, operating in accordance with certain embodiments of the present invention operate in a manner that significantly reduces the chance that any critical metadata 170 is lost, even if PLP capacitor 130 fails prematurely. This is further explained with reference to FIGS. 2 and 3, below. The approaches described herein can be carried out by SSD controller 140, other devices, software, firmware, or a combination thereof.

Figure 2:
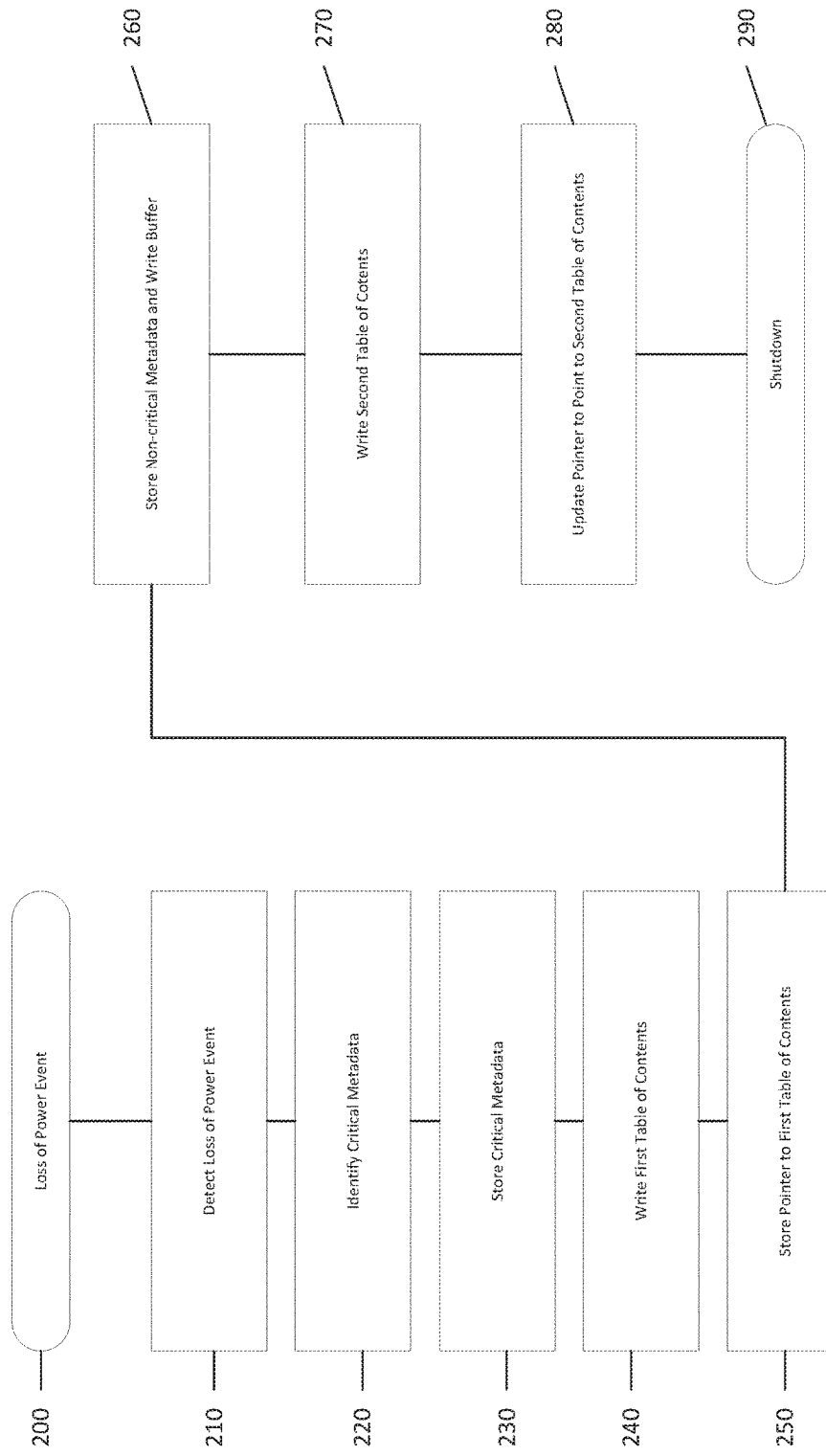
FIG. 2 illustrates a process of handling a power loss event according to certain embodiments of the present invention.

FIG. 2 illustrate a process of hardening data in accordance with certain embodiments of the present invention.

The process begins at 200 when a power loss event occurs. A power loss event can include, but is not limited to, the failure of the power grid external to the system in which the SSD resides, the failure of the power supply internal to the system in which the SSD resides, or a failure of the power supply within the SSD itself. Further, although the process described herein is described with a specific order, other steps may occur in between certain steps, steps may occur at the same time, and some steps may not fully complete before other steps begin.

At Step 210, the SSD, through a controller measuring internal voltages and currents, or other mechanisms, detects the loss of power event. After detecting the power loss event the SSD begins the hardening process. The controller, another element, or a combination of elements may carry out the process without departing from the spirit of the invention.

At Step 220, the SSD identifies the critical metadata stored in the volatile memory. Step 220 may be performed prior to power loss. For example, firmware may be designed to keep a list of the critical and non-critical metadata addresses during regular operation. The firmware may keep track of the critical metadata and non-critical metadata in separate lists during regular operation of the SSD. Further a person of ordinary skill in the art would understand that the firmware may keep track of the critical and non-critical metadata in different ways, such as tables, without departing from the spirit of the invention. Critical metadata may be any data that the SSD requires in order to boot the SSD and allow read/write access to all user data and lookup tables. Non-critical metadata may be any data that is useful but the absence of which does not make the SSD unusable. Moreover, a person of ordinary skill in the art would understand that the data that makes up the critical metadata or non-critical metadata may vary without departing from the spirit of the invention.

Next, at Step 230, the SSD begins storing the critical metadata. Unlike many traditional SSDs, SSDs in accordance with certain embodiments of the present invention prioritize storing this essential data over data whose loss will not "brick" the SSD.

At Step 240, the SSD writes a first table of contents corresponding to the critical metadata. The first table of contents may be written after all of the metadata is stored or it may be written as the critical metadata is stored. The table of contents can be stored in the main non-volatile memory or in other non-volatile memory depending on the size of table, availability of memory, and/or other design decisions/constraints. In some embodiments, the table of contents is a set of entries. In certain embodiments, the entries each contain a pointer to a data structure. Often there will be more than one entry because there will be multiple data structures stored as part of hardening of the critical metadata and each entry of the table of contents will point to a different one of the data structures storing critical metadata.

At Step 250, the SSD stores a pointer to the first table of contents. In some embodiments of the present invention, the pointer is stored in a fixed location within the secondary non-volatile memory, such as the SPI-NOR described with respect to FIG. 1. A person of ordinary skill in the art will understand that there are many different possible locations to store the first table of contents with departing from the spirit of the inventions. Storing the pointer to the first table contents at a known location allows the SSD to find it upon boot up. The SSD uses the pointer to identify and use the critical metadata in order to provide read-only access after a power loss event.

Critical metadata is only a fraction of the data stored in volatile memory prior to the loss of power event. As a result, storing the critical metadata is a relatively quick process that does not require nearly as much power as fully hardening all of the data stored in volatile memory prior to the loss of power. Prioritizing the storage of the critical metadata and creating a first table of contents, rather than waiting until all of the data stored in volatile memory is hardened, dramatically reduces the probability that a SSD in accordance with certain embodiments of the present invention will be "bricked" even where the SSD's PLP systems fail prematurely.

At Step 260, the SSD begins to store the remaining data from the volatile memory. This can include, but is not limited to non-critical metadata and the write buffer. In an ideal case this data is also hardened, but as mentioned previously, should the PLP component(s) fail prematurely, the loss of this data will not prevent all access to SSD. In the worst case, data in the write buffer which has been acknowledged to the host as having been written successfully will be lost, in which case the SSD may return an unrecoverable error status to the host if it attempts to subsequently read this data, but otherwise the SSD may be able to reads and write other data as normal. A person of ordinary skill in the art would understand that design choices may dictate what data is stored at this point. Not all non-critical data might be stored at once, and some prioritization may occur when determining which non-critical data is hardened first. The non-critical data may be identified, and ranked, during step 220, or the prioritization can occur at another point in the process. For example, data which is part of write data transfers that are small in size may be prioritized over data which is part of a much larger data transfer, since if hardening is only partly complete for a large data transfer, the data transfer as a whole must be categorized as having failed. Therefore, for a given amount of reserve power available, it may be better to prioritize the full hardening of many smaller data transfers than risk using reserve power for larger transfers for which hardening may never complete due to depletion of the reserve power.

At Step 270, the SSD stores a second table of contents in the main non-volatile memory. In certain embodiments of the present invention, the second table of contents is written to a different location than the first table of contents and in others it may be stored at the same location or even overwrite the first table of contents. The second table of contents includes all of the information from the first table of contents as well as information related to the newly hardened non-critical data, such as new entries containing pointers to additional data structures corresponding to the newly hardened data.

In some embodiments, where certain non-critical data is prioritized, there may be more than one second table of contents created on a batch by batch basis as different batches of non-critical data are hardened.

At step 280, the pointer in the secondary non-volatile memory is replaced with a pointer to the second table of contents. However, in some embodiments, the pointer to the second table of contents may be written in a separate location within the secondary non-volatile memory. A person of ordinary skill in the art would understand that different design choices can be made as to where the pointer to the second table of contents is stored. For example, overwriting the first pointer can conserve space in the limited secondary non-volatile storage. On the other hand, storing the pointers in different locations may be beneficial to determine how far the hardening process progressed before a total loss of power occurred.

Once the pointer is updated to point to the second table of contents, the SSD has completed hardening all of the data formerly stored in the volatile memory. Upon recovery from the power loss event, the SSD will be able to replay the write buffer and process the other non-critical data and return to a point where it would have been if all operations ceased without a loss of power.

At Step 290, the SSD completes the shutdown process and ceases all activity until power is restored. A person of ordinary skill in the art would understand that there may be a number of different processes and tasks the SSD must complete before a full shutdown occurs and that not all of the tasks are described with respect to FIG. 2 or this application.

Figure 3:
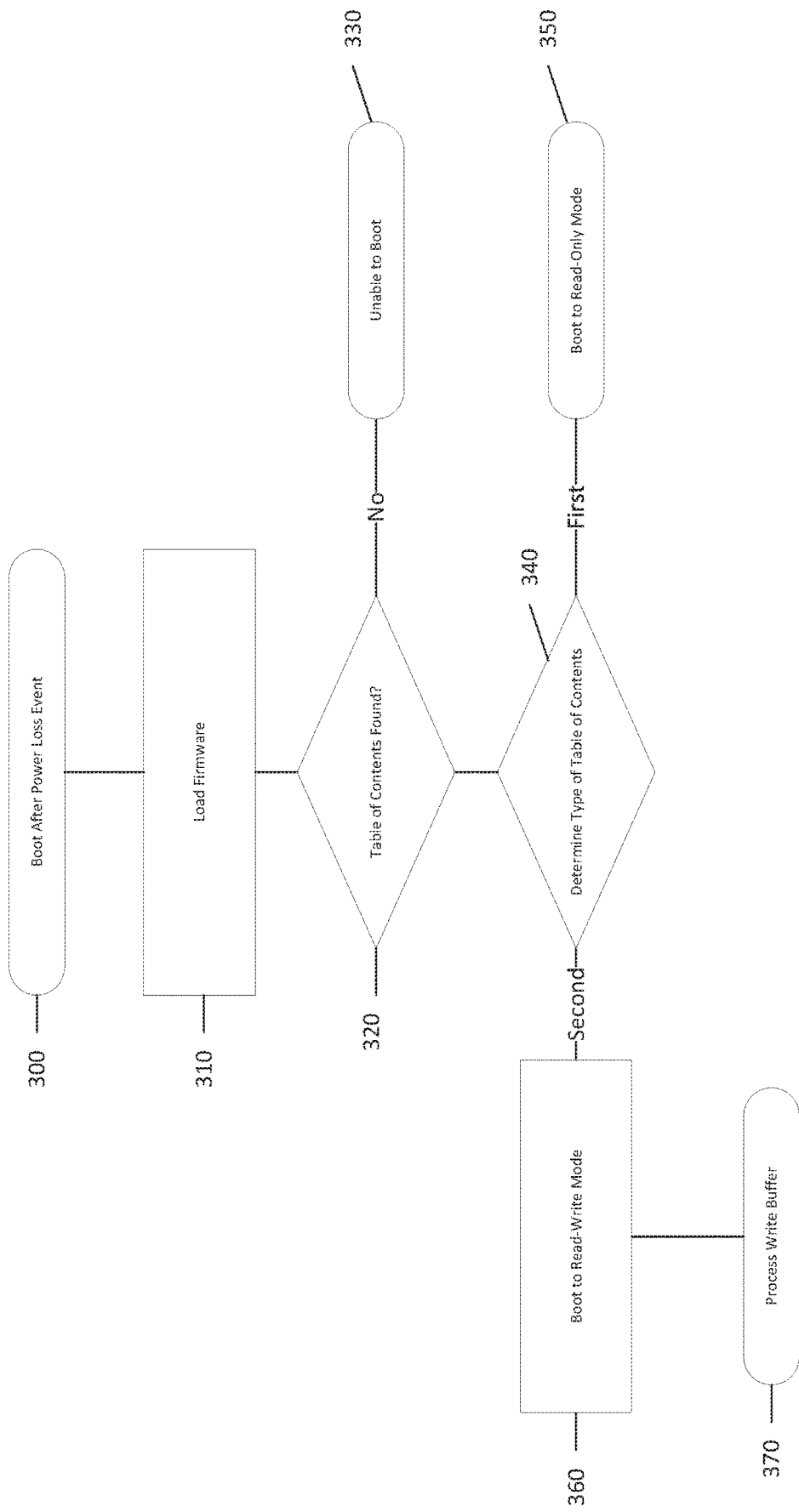
FIG. 3 illustrates the process of recovering from a power loss event in accordance with certain embodiments of the present invention.

FIG. 3 illustrates a process of SSD operation on boot up of the SSD in accordance with the certain embodiments of the present invention. The steps described herein may be carried out by a controller, another component, software, and/or a combination thereof without departing from the spirit of the invention.

At or before Step 300, power is restored to the SSD.

At Step 300, the SSD begins the initial boot-up process.

At Step 310, the SSD loads its firmware and begins to operate in accordance with the firmware. A person of ordinary skill in the art will understand that firmware represents the initial low level operating instruction set of the SSD and may comprise a mix of software, and/or hardware without departing from the spirit of the invention.

In some embodiments, the firmware may include an ability to detect that the SSD is recovering from an unexpected power loss event. In such embodiments, the steps described herein may not occur when recovering from an expected power loss event, such as a scheduled shutdown of the SSD.

In Step 320, the SSD determines if any table of contents for the data that was stored in the volatile memory prior to the power loss event can be found. In certain embodiments of the present invention, this can be done by checking if any pointers to a table of contents are available at a fixed location within the secondary non-volatile memory, such as the SPI-NOR. However, a person of ordinary skill in the art would understand that a number of different techniques can be used to determine if tables of contents where written and are accessible, such as setting a flag indicating that a certain table of contents and a pointer thereto were successfully saved prior to total power loss or shutdown of the SSD. Further, a person of ordinary skill in the art would understand that the process of determining whether any table of contents exists may be part of the same process as determining what type of table of contents exists.

If no tables of contents are identified, the process ends with Step 330. At Step 330, the SSD is unable to boot because it does not have the critical metadata about the information previously written to the main non-volatile memory. As a result, the data is unusable to the SSD and the SSD cannot perform further operations. As explained above, by hardening the critical metadata first, and storing a separate table of contents corresponding to the critical metadata before hardening any of the other data stored in the volatile memory at the time of a power loss event dramatically reduces the chance that an SSD in accordance with certain embodiments of this invention ever reaches Step 330. In some implementations, even though the SSD is unable to boot and perform normal read and write data operations, it may be able to respond to certain commands from the host to provide error status and/or error data logs; run diagnostic aids or tools as an aid to identifying causes of the failure to boot and in some other implementations may offer basic access the data stored in main non-volatile memory to enable a suitably configured host to perform data recovery.

At Step 340, the SSD determines what kind of table contents is stored. This can be done of different ways, including by setting flags within the secondary non-volatile memory or checking if a pointer is stored in a predetermined location with the secondary non-volatile memory. However, a person of ordinary skill in the art would understand that a number of different methods can be employed for determining which table of contents the pointer is pointing to without departing from the spirit of the invention. For example, the pointers can be store in a data structure that contains additional attributes that indicate the type of table of contents the pointer is pointing to, or the address value of the pointer may be used to indicate the type of table of contents.

If only the first table of contents and/or corresponding pointer to the first table of contents are found, then the SSD enters Step 350. At Step 350, the SSD boots into read-only mode. In read only-mode, the data previously stored in the main-non-volatile memory can be accessed, but the data that was in the process of being written to the SSD during the power loss event will be lost and no new data can be written to the SSD. Although this outcome is not the optimal case, it is preferable to a case where the SSD is completely inaccessible, which can occur when, under certain prior art approaches where the critical metadata is hardened but there is no corresponding table of contents to access that data.

On the other hand, if the second table of contents and/or pointer thereto is located and the SSD is able to retrieve the second of table of contents, then the SSD proceeds to Step 360. At Step 360, the SSD enters read-write mode and is fully functional. At this point, previously stored data can be retrieved and new data can be written to the SSD.

Additionally, in certain embodiments, the SSD may also enter Step 370 as part of the recovery process. At Step 370, the SSD processes the dirty write buffer data, that is the write buffer data saved during the shutdown process, but not properly stored in accordance with normal operating procedures. The processing of the write buffer data effectively completes the data write operations that were interrupted by the PLP event, by storing the data in accordance with normal operating procedures. Once the dirty write buffer data is processed, the SSD can resume operation as if a power loss event did not occur.

Other objects, advantages and embodiments of the various aspects the certain embodiments described herein will be apparent to those who are skilled in the field of the invention and are within the scope of the description and the accompanying Figures. For example, but without limitation, structural or functional elements might be rearranged consistent with the certain embodiments described herein. Similarly, principles according to the certain embodiments described herein could be applied to other examples, which, even if not specifically described here in detail, would nevertheless be within the scope of certain embodiments described herein.

Further, a person of ordinary skill in the art would understand that certain aspects of this invention, such as the various controllers, may be implemented as hardware, software, firmware or a combination thereof. The descriptions of such elements in certain embodiments described herein are not intended to limit the implementation of these types of elements to a singular implementation. A person of ordinary skill in the art would appreciated that there are number ways to implement certain elements of certain embodiments described herein without departing from the spirit of the invention itself.

Additionally, elements reference throughout certain embodiments described herein can be divided into certain sub-elements, combined, or duplicated without departing from the spirit of the invention.

What is claimed:

1. A method of operating a Solid State Drive (SSD), the method comprising:
   identifying critical metadata corresponding to data previously written to the SSD;
   storing the critical metadata in a non-volatile memory in response to a power loss event;
   writing a first table of contents corresponding to the stored critical metadata in the non-volatile memory;
   storing a pointer pointing to the first table of contents or a second table of contents;
   determining whether the pointer points to the first table of contents or the second table of contents, wherein the second table of contents is configured to store the critical metadata and write buffer data previously written to the SSD;
   if the pointer points to the first table of contents, entering a read-only mode upon boot; and
   if the pointer points to the second table of contents, entering a read-write mode upon boot.

2. The method of claim 1, the method further comprising:
   storing data, stored in a write buffer, in the non-volatile memory; and
   storing non-critical metadata in the non-volatile memory.

3. The method of claim 2, the method further comprising:
   writing a second table of contents corresponding to the stored critical metadata, the stored non-critical metadata, and to the stored write buffer data to the non-volatile memory; and
   updating the pointer to point to the second table of contents.

4. The method of claim 1, wherein the second table of contents further comprises stored non-critical metadata.

5. The method of claim 1, the method further comprising:
   processing the stored write buffer data.

6. The method of claim 1, wherein storing the pointer comprises storing the pointer in a second non-volatile memory different than the non-volatile memory.

7. The method of claim 6, wherein the second non-volatile memory is SPI-NOR flash memory.

8. The method of claim 1, wherein the non-volatile memory is NAND flash memory.

9. The method of claim 1, wherein the first table of contents comprises a plurality of entries, each pointing to a different data structure of a plurality of data structures.

10. The method of claim 3, wherein the second table of contents comprises a plurality of entries, each pointing to a different data structure of a plurality of data structures.

11. A Solid State Drive (SSD) comprising,
    a memory controller;
    a non-volatile memory; and
    a power loss protection capacitor; wherein, the memory controller is configured to:
    identify critical metadata corresponding to data previously written to the SSD; and
    in response to a power loss event:
    store the critical metadata in a non-volatile memory;
    write a first table of contents corresponding to the stored critical metadata to the non-volatile memory; and
    store a pointer pointing to the first table of contents or a second table of contents;
    determine whether the pointer points to the first table of contents or the second table of contents, wherein the second table of contents is configured to store the critical metadata and write buffer data previously written to the SSD;
    if the pointer points to the first table of contents, enter a read-only mode upon boot; and
    if the pointer points to the second table of contents, enter a read-write mode upon boot.

12. The SSD of claim 11, wherein the SSD further comprises a write buffer and the memory controller is further configured to, in response to the power loss event:
 store data, stored in the write buffer, in the non-volatile memory; and
 store non-critical metadata in the non-volatile memory.

13. The SSD of claim 12, wherein the memory controller is further configured to in response to the power loss event:
 write a second table of contents corresponding to the stored critical metadata, the stored non critical metadata, and to the stored write buffer data to the non-volatile memory; and
 update the pointer to point to the second table of contents.

14. The SSD of claim 11, wherein the second table of contents is further configured to store non-critical metadata.

15. The SSD of claim 11, wherein the SSD is further configured to:
 process the stored write buffer data.

16. The SSD of claim 11, wherein the SSD further comprises a second non-volatile memory different from the non-volatile memory and the memory controller is configured to store the pointer in the second non-volatile memory.

17. The SSD of claim 16, wherein the second non-volatile memory is SPI-NOR flash memory.

18. The SSD of claim 11, wherein the non-volatile memory is NAND flash memory.

19. The SSD of claim 11, wherein the first table of contents comprises a plurality of entries, each pointing to a different data structure of a plurality of data structures.

20. The SSD of claim 13, wherein the second table of contents comprises a plurality of entries, each pointing to a different data structure of a plurality of data structures.

\* \* \* \* \*